Jan. 12, 1926.  M. BRAUN ET AL  1,569,170
INSECT TRAP
Filed April 4, 1924
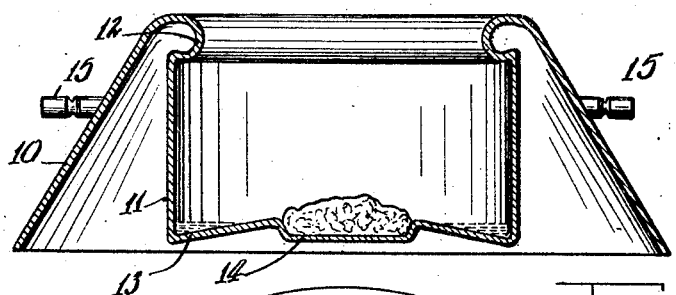
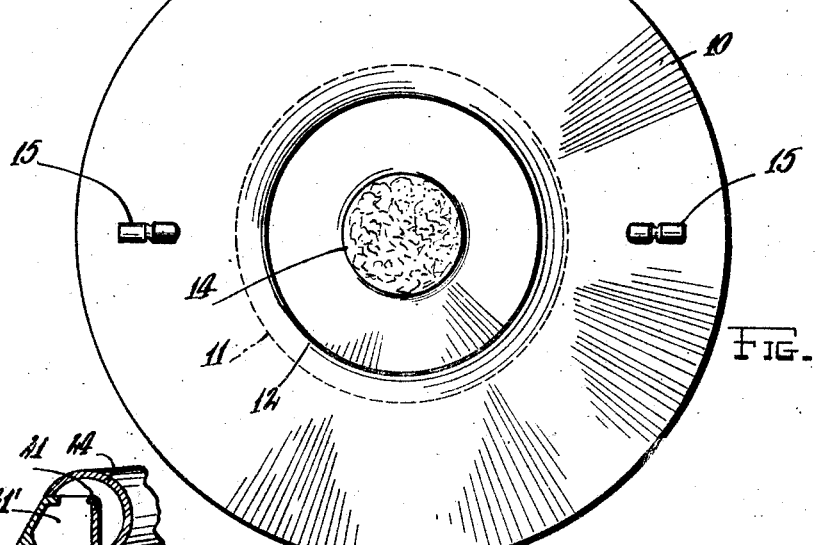
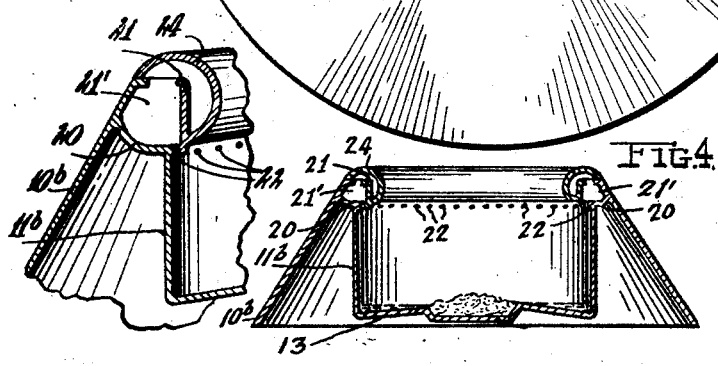
Inventors
Maurice Braun
Geza Gelencser
BY
ATTORNEY Patented Jan. 12, 1926.

1,569,170

UNITED STATES PATENT OFFICE.

MAURICE BRAUN AND GEZA GELENCSER, OF NEW YORK, N. Y.

INSECT TRAP.

Application filed April 4, 1924. Serial No. 704,123.

*To all whom it may concern:*

Be it known that MAURICE BRAUN and GEZA GELENCSER, citizens of Austria, residing at New York city, in the county of New York and State of New York, have invented certain new and useful Improvements in Insect Traps, of which the following is a specification.

This invention relates to an insect trap, the trap here shown being designed more particularly for use in catching house insects of the crawling type, the invention having for an object to provide a novel and improved type of trap for this purpose.

For further comprehension of the invention, and of the objects and advantages thereof, reference will be had to the following description and accompanying drawing, and to the appended claims in which the various novel features of the invention are more particularly set forth.

Fig. 1 of the drawing is a central vertical sectional view of our improved trap.

Fig. 2 is a plan view thereof.

Fig. 3 is a fragmentary vertical sectional view showing a modified form of the trap.

Fig. 4 is a central vertical sectional view of the modified construction shown in Fig. 3.

Our improved trap as shown in Figs. 1 and 2 is made of a single piece of material, preferably glass, and consists of an outer member 10 of frusto-conical form which forms the support on which the trap rests. This member 10, at its upper end, unites with a depending cylindrical bowl 11, an inwardly turned bead 12 being formed at the upper edge of this bowl, where it unites with the member 10. The bottom 13 of the bowl flares or inclines upwardly from the sides of the bowl toward the centre thereof, and the central portion thereof is depressed as at 14 to form a shallow central recess, a shallow annular side recess being formed between the edge of this recess 14 and the side of the bowl by reason of the slope or incline of the said bottom. The bottom 13 of the bowl is spaced a slight distance above the lower edge of the outer member 10 so that the latter may contact at its lower edge with the surface on which the trap is resting, the insects entering the trap by crawling up the inclined surface of the said outer member 10. Within the central recess 14 in the bottom of the bowl 11 we place a food that will attract the insects, and which is visible through the glass walls of the trap. In the annular depression between the said recess 14 and the sides of the bowl we place a liquid to receive the insects, which liquid may be perfumed. The inner surface of the side wall of the bowl is preferably coated with liquid or other material of small relative viscosity to cause the insect to slide down the bowl and into the liquid in the annular depression in the bottom of the latter when it passes under the bead on the upper edge of the bowl. The member 10 may be provided with a number of knobs or handles 15.

In the form of the invention shown in Fig. 3 the outer frusto-conical member 10<sup>b</sup> corresponds in shape to the member 10. Projecting inwardly from this member a short distance below the upper edge thereof is a flange 20 from the inner end of which a cylindrical flange 21 projects upward, the top of this flange 21 being flush with the top of the member 10<sup>b</sup>. An annular receptacle 21' is thus formed in the member 10 at the top thereof. From the flange 20 the bowl 11<sup>b</sup> depends downwardly, the bottom of this bowl corresponding in shape to the bottom of the bowl 11. The point of juncture of the top of the bowl with the flange 20 is slightly outward, radially considered, of the flange 21, while a series of small apertures 22 are formed in the bottom of the flange 20 in vertical alinement with the inner face of the side wall of the bowl, through which a liquid placed in the receptacle may drip down on the said inner face of the bowl. An annular bridging member 24 of parti-elliptical form in cross section covers the top of the receptacle 21' formed between the flange 21 and the frusto-conical member 10<sup>b</sup> one edge of this member 24 resting upon the top of the said member 10<sup>b</sup> the member curving inwardly and downwardly to rest at its other edge against the bottom of the flange 21. In this arrangement a suitable liquid is placed in the receptacle 21' in substitution for the material with which the sides of the bowl are coated.

Having thus described our invention what we claim as new and desire to protect by Letters Patent of the United States is as follows:—

1. An insect trap comprising an outer inclined member united at its upper edge with a depending interior bowl, the latter having an inwardly projected and rounded bead at its top edge where it unites with the outer member, said interior bowl being arranged to present in its bottom a central recess and an annular side recess.

2. An insect trap comprising an outer inclined member formed adjacent its top with an annular receptacle, a bowl depending from the bottom of said receptacle, said receptacle being formed in its bottom with a number of small apertures vertically alined with the inner face of the side wall of the said bowl, and a bridging member covering the top of the said receptacle.

3. An insect trap comprising an outer inclined member formed adjacent its top with an annular receptacle, a bowl depending from the bottom of said receptacle, said receptacle being formed in its bottom with a number of small apertures vertically alined with the inner face of the side wall of the said bowl, and a bridging member covering the top of the said receptacle, said bridging member resting at one edge on the top of the said inclined outer member and engaging at its other edge the inner wall of the said receptacle adjacent the bottom thereof.

In testimony whereof we have affixed our signatures.

MAURICE BRAUN.
GEZA GELENCSER, M. D.